US007880147B2

(12) United States Patent
Morrisroe et al.

(10) Patent No.: US 7,880,147 B2
(45) Date of Patent: Feb. 1, 2011

(54) COMPONENTS FOR REDUCING BACKGROUND NOISE IN A MASS SPECTROMETER

(75) Inventors: Peter J. Morrisroe, New Milford, CT (US); Joseph L. DeCesare, Redding, CT (US)

(73) Assignee: PerkinElmer Health Sciences, Inc., Waltham, MA (US)

( * ) Notice: Subject to any disclaimer, the term of this patent is extended or adjusted under 35 U.S.C. 154(b) by 451 days.

(21) Appl. No.: 12/019,308

(22) Filed: Jan. 24, 2008

(65) Prior Publication Data

US 2009/0189067 A1 Jul. 30, 2009

(51) Int. Cl.

| | |
|---|---|
| ***H01J 3/14*** | (2006.01) |
| ***H01J 3/26*** | (2006.01) |
| ***H01J 49/42*** | (2006.01) |
| ***H01J 1/50*** | (2006.01) |
| ***G21K 1/08*** | (2006.01) |
| *H01J 49/00* | (2006.01) |
| *B01D 59/44* | (2006.01) |

(52) U.S. Cl. .................... 250/396 R; 250/399; 250/281

(58) Field of Classification Search ............. 250/396 R, 250/399, 281, 282, 286–287, 290–299
See application file for complete search history.

(56) References Cited

U.S. PATENT DOCUMENTS

| | | | | |
|---|---|---|---|---|
| 4,736,101 | A * | 4/1988 | Syka et al. | 250/282 |
| 5,994,697 | A * | 11/1999 | Kato | 250/282 |
| 6,541,766 | B2 * | 4/2003 | Kato | 250/281 |
| 6,545,268 | B1 * | 4/2003 | Verentchikov et al. | 250/281 |
| 6,621,078 | B2 * | 9/2003 | Taniguchi et al. | 250/282 |
| 7,276,688 | B2 * | 10/2007 | Weiss | 250/288 |
| 2002/0125425 | A1 * | 9/2002 | Kato | 250/288 |
| 2006/0163468 | A1 * | 7/2006 | Wells et al. | 250/281 |
| 2008/0017794 | A1 * | 1/2008 | Verbeck | 250/292 |

OTHER PUBLICATIONS

"Notification of Transmittal of the International Search Report and the Written Opinion of the International Searching Authority, or the Declaration," International Filing Date: Jan. 15, 2009, International Application No. PCT/US2009/000278, Applicant: Perkinelmer Health Sciences, Inc., Date of Mailing: Oct. 6, 2009, pp. 1-11.

* cited by examiner

*Primary Examiner*—Jack I Berman
*Assistant Examiner*—Brooke Purinton
(74) *Attorney, Agent, or Firm*—Cesari and McKenna, LLP; Patricia A. Sheehan

(57) ABSTRACT

Novel components reduce background noise caused by secondary ions generated by metastable entity bombardment in a mass spectrometric system. Layered structures for exit electrodes and deflector plates confine secondary ions in a local low-energy well, preventing them from entering the detector.

23 Claims, 5 Drawing Sheets

COMPONENTS FOR REDUCING BACKGROUND NOISE IN A MASS SPECTROMETER

BACKGROUND OF THE INVENTION

1. Field of the Invention

The invention relates to mass spectrometry. In particular, this invention provides method and apparatus for reducing background noise caused by neutral metastable entities in a mass spectrometer. More particularly, instrument components are described for trapping secondary ions generated by bombardment of components by metastable entities.

2. Background Information

Mass spectrometry is an analytical technique that exploits the dependence of an ion trajectory through electric and magnetic fields on the ion mass/charge ratio. Typically the prevalence of component ions is measured as a function of mass/charge ratio and the data are assembled to generate a mass spectrum of a physical sample. The mass spectrum is useful, for example, for identifying compounds of unknown identity, determining the isotopic composition of elements in a known compound, resolving the structure of a compound and, with the use of calibrated standards, quantitating a compound in a sample.

Analysis by mass spectrometry entails a sequence of three component processes, each of which can be performed by any one of several types of devices. First, an ion source converts the sample into constituent ions. Second, after leaving the ion source, the charged species in the fragmented sample undergo sorting according to mass/charge ratio in a mass analyzer. Finally, the sorted ions enter a detector chamber, in which a detector converts each separated ion fraction into a signal indicative of its relative abundance. The attributes of the particular ion source, mass analyzer, and detector assembled to constitute a mass spectrometer tailor the capabilities of the instrument to analysis of particular sample types or to acquisition of specialized data.

For some applications, analysis by mass spectrometry can be enhanced by combination with other analytical techniques that separate the sample into constituents before ionization in the mass spectrograph. For example, in a common enhancement a gas chromatograph separates the sample into constituent components before it meets the spectrometer ion source, to improve distinction between compounds of relatively low molecular weight. This arrangement, termed gas chromatography-mass spectrometry ("GC/MS"), is widely used to identify unknown samples, especially in environmental analysis and drug, fire and explosives investigations.

The separative powers of gas chromatography enable GC/MS to identify substances to a much greater certainty than is possible using a mass spectrometry assembly alone. However, its necessary use of an inert carrier gas also introduces analytical difficulties in the form of background noise.

Some atoms of an inert carrier gas such as helium are excited to higher-energy metastable states in the mass spectrometer due, for example, to electron impact in the ion source or by collision with helium ions accelerated by the focusing elements. The common helium metastable states, e.g., $2^3S_1$, have energy levels of approximately 20 eV and can persist for several seconds.

The metastable atoms are uncharged and thus not focused by any of the ion optics. They tend to follow a line-of-sight path and bombard instrument components in their paths. The collisions generate secondary ions by a process known as Penning ionization, whereby ionization occurs due to a transfer of potential energy between atoms in an excited metastable state and a source of secondary ions. The secondary ion sources are believed primarily to be contaminants (for example, hydrocarbons)—arising from the pump oil, sample residue, and the reduced pressure atmosphere—on component surfaces.

Secondary ions created early in the matter stream, such as in the ion source or in the upstream portion of the analyzer, have the opportunity to be sorted by the analyzer and counted by the detector as representative of their chemical composition and structure. However, if the secondary ions are instead created near the exit from the analyzer, such as by striking the ion-focusing lens gating the detector chamber, or in the detector chamber itself, the secondary ions are not resolvable by the analyzer. If these late-created secondary ions enter the detector, they do so randomly, generating background noise. Metastable helium atoms are a major source of noise in GC/MS systems that use helium carrier gas.

Secondary ions can also be generated by excited neutral particles of other elements introduced, for example, by an inductively coupled plasma ("ICP") ion source or by liquid chromatography-mass spectrometry ("LC/MS") and other approaches that ionize the sample at atmospheric or reduced pressure.

SUMMARY OF THE INVENTION

The invention provides novel components for reducing background noise caused by metastable neutral atoms and molecules in a mass spectrometric system and related novel methods of analysis by mass spectrometry.

In one aspect the invention provides a novel multi-layer lens for admitting ions from the mass analyzer to the detector system. The lens, which has a central aperture for transmitting the subject ions, includes external and middle electrodes biased to create within the lens a local potential-energy well for secondary ions. Secondary ions created by particle bombardment of the middle electrode are trapped in the potential-energy well and remain confined on the surface of the middle electrode. Accordingly, such secondary ions are unable to contribute to background noise in the detector.

In particular, the lens comprises a layered structure of front, middle and back electrodes, electrically isolated from one another. The front electrode includes a grid which distributes the potential of the front electrode over the front of the lens to provide electrostatic shielding of the middle electrode while permitting neutral and charged particles to pass. Subject ions are focused to the central aperture while neutral particles pass through the front electrode and strike the surface of the middle electrode behind the grid.

The middle electrode is biased with respect to the front and back electrodes so that a secondary ion at the middle electrode is at a lower potential energy than it would be at either of the front and back electrodes. Namely, when negatively charged secondary ions are to be captured, the middle electrode is at a higher potential than is each of the front and back electrodes; conversely, for positively charged secondary ions the middle electrode is at a lower potential than is each of the front and back electrodes.

In a preferred embodiment, the external electrodes shielding the subject ions from the potential-energy well are grounded. This configuration contains the electric field created by the middle electrode and limits the influence of the middle electrode on the trajectories of the subject ions through the central aperture, such that, to the ions, the structure appears similar to a single grounded electrode.

A similarly layered deflector plate confines secondary ions generated by the impact of neutral metastable particles passing from the mass analyzer into the detector chamber. The grid-covered, low-potential-energy middle electrode surface of the layered deflector plate faces the admitting aperture so that neutral particles entering the chamber pass through the grid and strike the surface. Secondary ions thus generated are confined to the deflector plate middle electrode surface.

These layered biased structures reduce the system background noise caused by neutral metastable entities. The improved signal-to-noise ratio translates into a lower detectability limit for the mass spectrometric systems of the invention.

BRIEF DESCRIPTION OF THE DRAWINGS

The invention description below refers to the accompanying drawings, of which.

Figure 1:
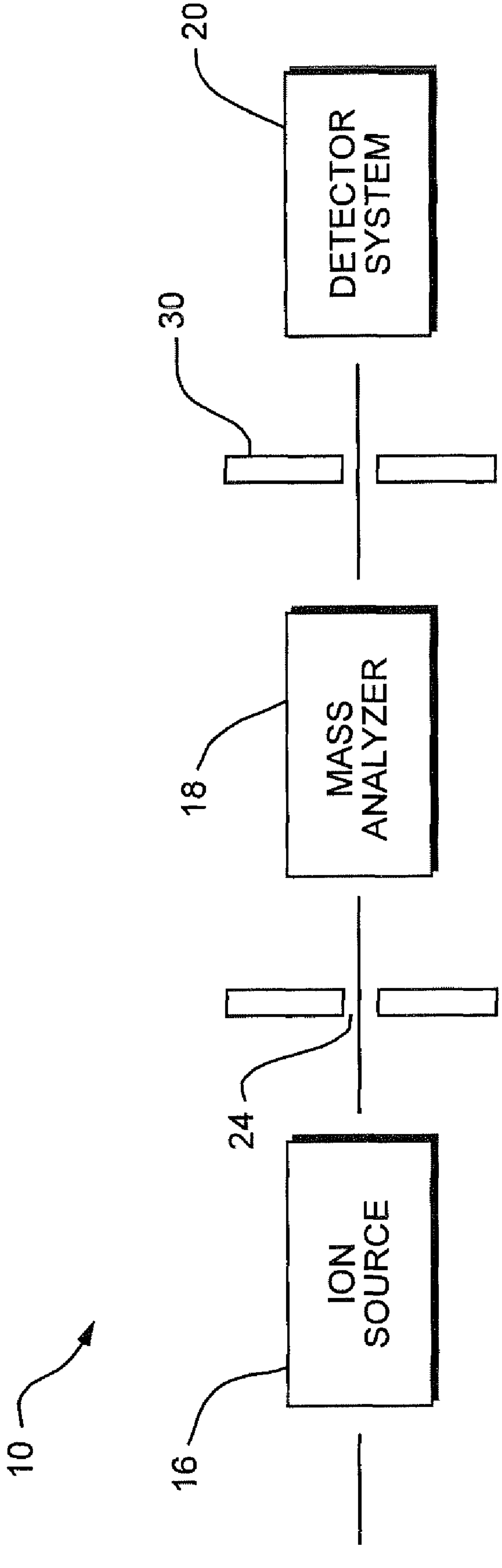
FIG. 1 (PRIOR ART)
FIG. 1 schematically depicts a mass spectrometry system compatible with an embodiment of the invention.

Features in the drawings are not, in general, drawn to scale.

DETAILED DESCRIPTION OF THE INVENTION

With reference to FIG. 1, a mass spectrometry system 10 of the prior art includes three principal components: an ion source 16, a mass analyzer 18 and a detector system 20. Techniques for accomplishing sample ionization, ion sorting and detection, and considerations informing assembly of these techniques to perform analysis by mass spectrometry are known to those skilled in the art of mass spectrometry.

The ion source 16 effects ionization of the sample by any one of several techniques, including electron ionization, chemical ionization, electrospray ionization, matrix-assisted laser desorption/ionization, and inductive coupling of a plasma.

The ionization technique may incidentally introduce neutral particles unrelated to the physical sample into the ion stream entering the mass analyzer. For example, argon or helium atoms are typically present downstream of an ICP ion source, whereas ions transferred from an ion source operating at atmospheric pressure are at risk for contamination by nitrogen molecules. Pre-ionization separation techniques are another source of extraneous neutral particles such as the excited helium atoms normally seen with GC/MS, which typically uses a helium carrier gas. LC/MS may also introduce nitrogen molecules from an active agent of the ion source—such as a nebulizing gas—or from the atmosphere in which it operates.

After treatment by the ion source 16, the adventitious neutral particles are electrostatically propelled with the constituent ions of the sample through an inlet 22 in a gate 24 into the mass analyzer 18. The gate 24 may be a focusing lens, a collimator or any other well-known apparatus, compatible with the function of the other components of the spectrometry system, for admitting ions into the analyzer.

The mass analyzer 18—for example, a sector field, time-of-flight, or quadrupole analyzer—sorts the ions according to their mass/charge ratio. The sorted ions pass through an aperture in an exit lens 30, for example, a grounded plate with a standard 8 mm central aperture, to be counted by the detector system 20.

Neutral particles in the analyzer 18 are not sorted by the applied electric and magnetic fields and principally move through the analyzer 18 along straight paths between collisions. Sufficiently energetic neutral particles striking surface contaminants on instrument components generate secondary ions. Secondary ions generated from bombardment of the lens 30 near its aperture exit the analyzer through the aperture. Also, excited neutral particles leaving through the aperture may generate secondary ions by striking elements of the detector system 20. Secondary ions originating from these locations enter the detector unsorted and are counted randomly by the detector system 20, contributing to background noise.

Figure 2:
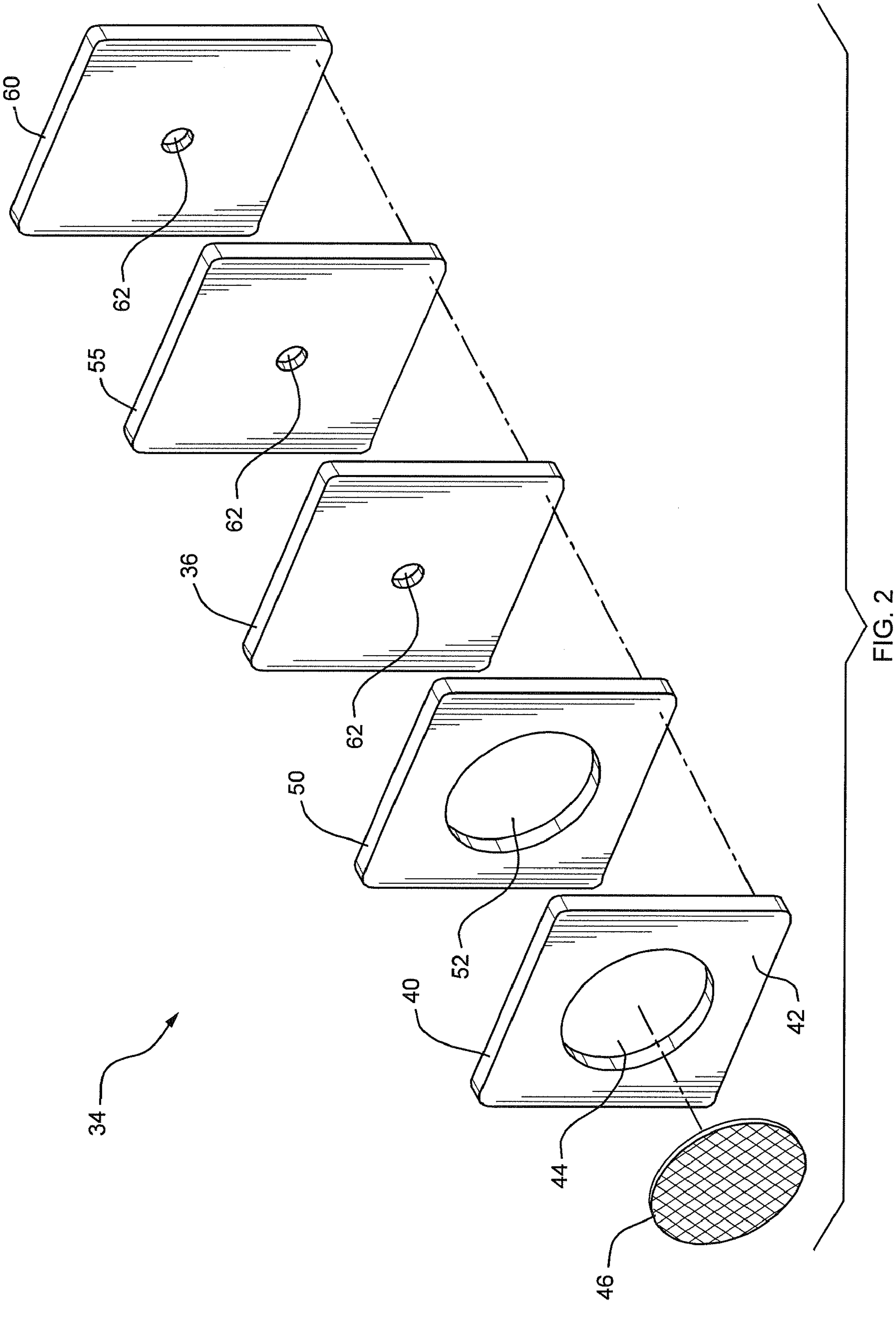
FIG. 2 is an exploded view of an ion-focusing lens constructed in accordance with an embodiment of the invention.

FIG. 2 shows in exploded view the layers of an illustrative embodiment of a noise-reducing composite exit lens 34 of the invention suitable for use in place of the prior art lens 30 in the mass spectrometry system 10. The lens 34 comprises a middle electrode 36 sandwiched between two external electrodes 40 and 60 with intervening insulating layers 50 and 55. The front electrode 40 consists of a solid conductive ring 42 around a central hole 44 with an attached conductive grid 46 covering the hole 44.

The front insulating layer 50 has a window 52 corresponding in size and shape to the hole 44. The conductive middle electrode 36, back insulating layer 55 and back electrode 60 respectively have aperture holes 62 of common shape and size, which are smaller than the window 52.

Figure 3B:
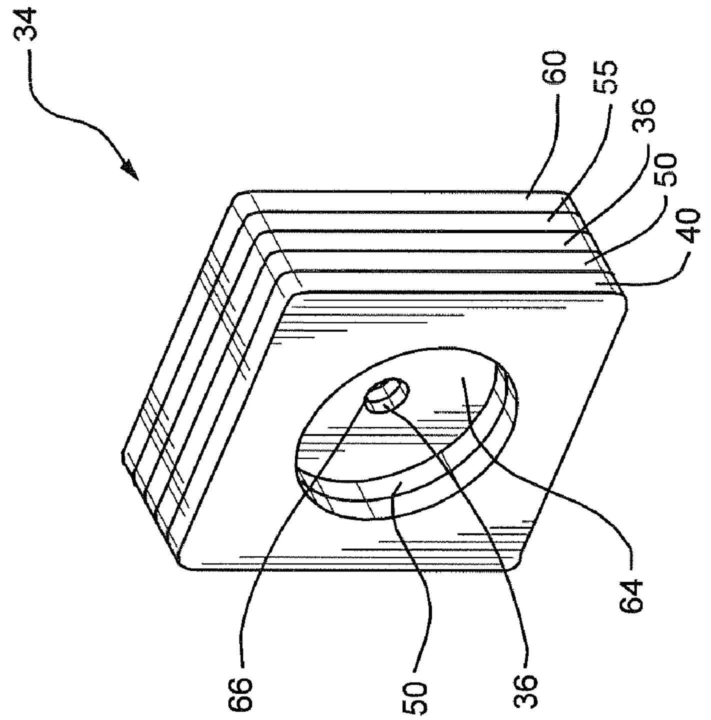
FIGS. 3A-3B show prospective views of an embodiment of the ion-focusing lens of the invention, FIG. 3A showing the complete assembly and FIG. 3B showing the lens with the grid removed for ease of viewing.
Figure 3A:
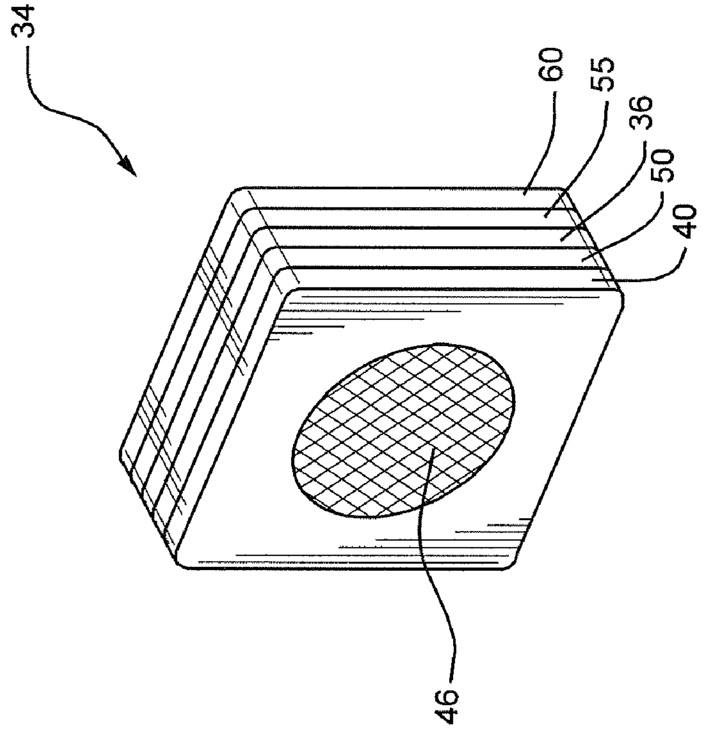

FIG. 3A shows the assembled composite lens of FIG. 2. FIG. 3B shows the lens 34 without the grid 46 to facilitate explanation. Referring now to FIGS. 2 and 3A-B, the grid-covered hole 44 and window 52 leave exposed on the middle electrode 36 a front surface 64 that is oriented toward the mass analyzer 18. The holes 62 in the middle electrode, back insulating layer 55, and back electrode 60 form a common aperture 66 through the lens 34 along an axis perpendicular to the exposed surface 64 of the middle electrode. In the embodiment, the common aperture 66 is centered with respect to the window 52. Optionally, the grid 46 has an opening (not shown) such that the aperture 66 extends through the front electrode 40.

In operation, the middle electrode 36 is maintained at a potential differing from the potential of the front electrode 40 and from the potential of the back electrode 60 so that an ion on the middle electrode 36 experiences a local minimum in potential energy. A middle electrode 36 at a more positive potential than the front 40 and back 60 electrodes will create a potential energy well for a negative ion. A middle electrode 36 at a less positive potential than the front 40 and back 60 electrodes creates a potential energy well for a positive ion. In one embodiment, the potential of the middle electrode 36 differs from those of the external electrodes 40 and 60 by 10 to 75 volts, or more.

In a preferred embodiment the two external electrodes 40 and 60 are grounded and the middle electrode 36 is at a potential differing from ground by 20 to 75 volts, or more. In a lens configured to confine negative secondary ions, the middle electrode potential is positive with respect to ground. To confine positive secondary ions, the middle electrode potential is negative with respect to ground. The grounded external electrodes 40 and 60 contain the electric field formed by the potential on the middle electrode 36 and limit the influence of the middle electrode on the trajectories of the subject ions through the aperture 66. A voltage supply (not shown) may be used to maintain the middle electrode 36 at the desired relative potential.

Ions approaching the lens 34 from the mass analyzer 18 pass through the grid 46 and are focused through the aperture 66. The lens 34 does not electrically focus any neutral particles. Neutral particles striking the lens 34 with sufficient energy generate secondary ions. Secondary ions generated near the aperture 66, by neutral particles that penetrate the grid 46 and then collide with the exposed surface 64 of the middle electrode, are prevented from leaving the surface 64 due to the local potential-energy minimum in the layered electrode 34. The localized secondary ions do not reach the detector 20 and the noise they would have generated is preempted. This is in contrast to the prior art lens 30 of FIG. 1, the front surface of which releases secondary ions, thus allowing them to enter the detector system 20 and contribute to background noise.

Figure 4:
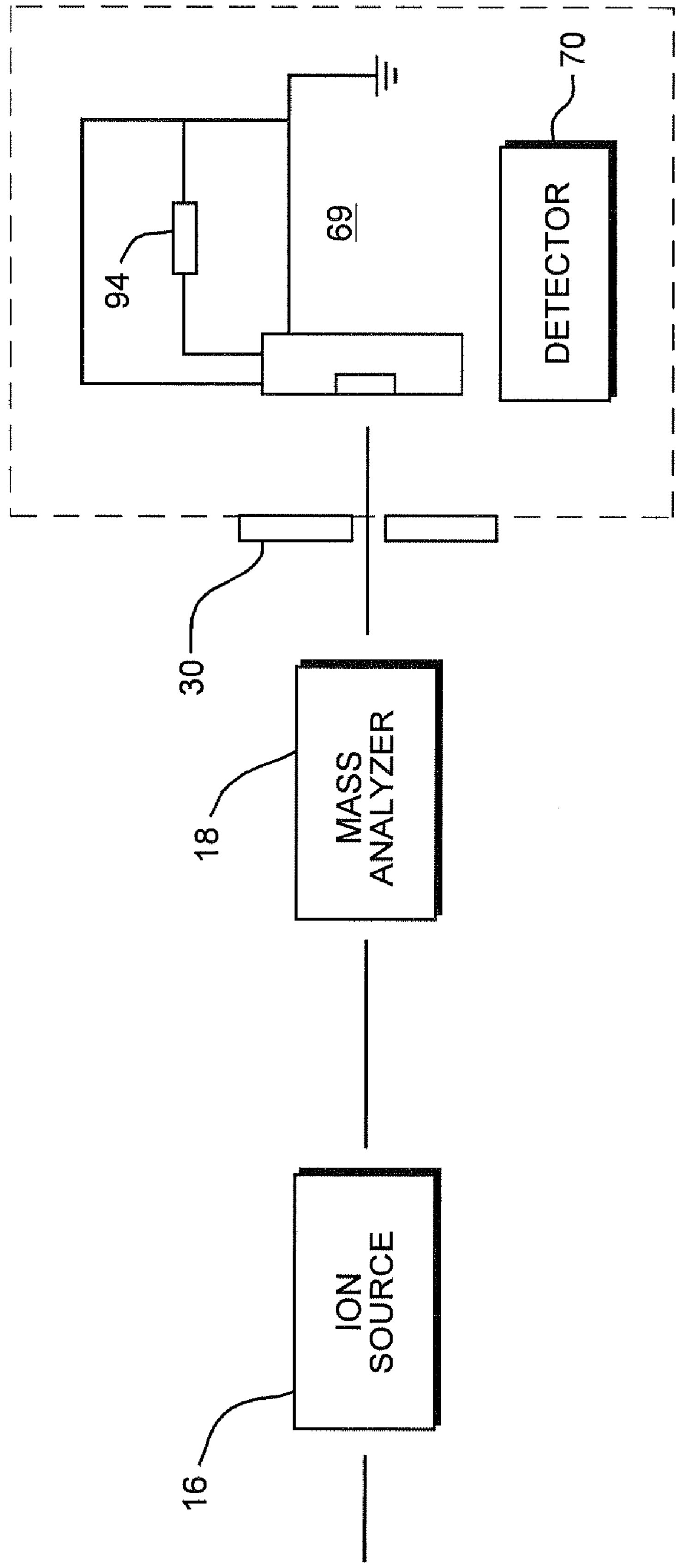
FIG. 4 shows a mass spectrometry system having a deflector plate constructed in accordance with an embodiment of the invention.

In another aspect, an embodiment of which is illustrated in FIG. 4, the invention provides a deflector plate 68 for confining secondary ions in a detector chamber 69 having an off-axis detector 70.

Figure 5:
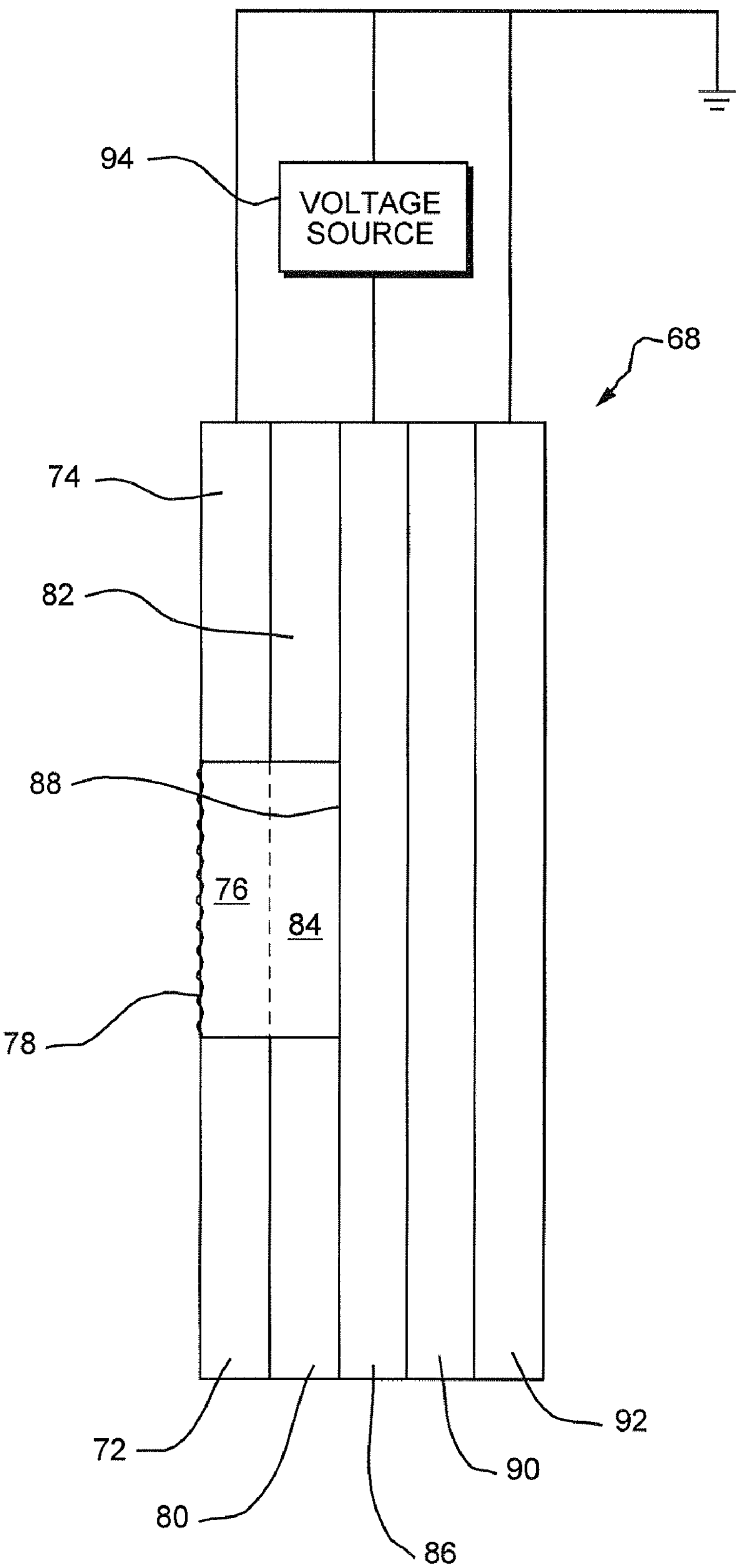
FIG. 5 depicts a cross-section of a deflector plate embodiment of the invention.

With reference to FIG. 5, the deflector plate 68 of the embodiment preferably comprises the following layers: a front electrode 72, a front insulating layer 80, a middle electrode 86, a back insulating layer 90 and a back electrode 92.

The front electrode 72 is a solid conductive ring 74 around an interior hole 76 with an attached conductive grid 78 covering the interior hole 76. The front insulating layer 80 is a solid frame 82 around a window 84 coextensive with the interior hole 76. The middle electrode 86 has a surface 88, facing the exit lens 30, exposed through the interior hole 76 and window 84.

The middle electrode 86 is maintained at a potential about 20 to 75, or more, volts higher or lower, depending on whether negative or positive secondary ions are targeted, than the potentials of each of the front electrode 72 and back electrode 92 by a voltage supply 94. In a preferred embodiment, the front electrode 72 and back electrode 92 are grounded.

Ions leaving the mass analyzer 18 pass through the exit lens 30 into the chamber 69 and are pulled into the off-axis detector 70, which is negatively biased by several thousand volts. Neutral particles entering the chamber 69 continue their trajectory until striking the exposed surface 88 of the middle electrode 86 facing the lens 30. Resulting secondary ions are held on the surface 88 and prevented from making their way into the detector 70. This is in contrast to mass spectrometry systems of the prior art, in which neutral particles collide with the chamber walls or other surfaces in the chamber 69, thereby generating secondary ions which are pulled into the detector and contribute to background noise.

The deflector plate of the invention 85 could in principle function without the back insulating layer 90 and the back electrode 92. The grounded back electrode 92 ensures that the electric field created by the middle electrode 86 is contained so as to minimize its influence the trajectories of ions entering the detector chamber 69.

The layered structures of the embodiments are readily constructed from stainless steel plate, poly(tetrafluoroethylene) sheet, and tungsten mesh. For example external and middle electrodes may be made of 0.5 mm-thick stainless steel with mesh on the front electrode and separated by 0.25 mm-thick plastic insulating layers. The mesh may be tungsten wire mesh of 50×50 wires/inch and 0.003 inch wire diameter, which does not unduly interfere with transmission of the subject ions. The layers may be held together by conventional means such as clamps or screws.

In other embodiments, the front electrode may be constituted entirely of mesh, without any solid border. As used herein, mesh denotes not only an interwoven or intertwined structure, but may equivalently be a grid or perforated material capable of distributing the potential of the middle electrode while allowing neutral and charged particles to pass. The relative sizes and positions of the holes and windows are not necessarily as described in the embodiments. Rather, the holes and windows may be in any relationship that establishes the middle electrode surface behind the mesh and, in the case of an exit lens, an aperture to pass subject ions out of the analyzer. Furthermore, the insulating layers adjacent the middle electrode may be absent altogether. For example, the electrodes may be captured at the edges and their mutual insulation maintained in the low-pressure atmosphere of the apparatus by gaps.

The specified voltage ranges were determined using a GC/MS system with a quadrupole analyzer and dynode detector. It is expected that similar voltage ranges would be effective for mass spectrometry systems having different principal components.

Although specific features of the invention are included in some embodiments and drawings and not in others, it should be noted that each feature may be combined with any or all of the other features in accordance with the invention.

It will therefore be seen that the foregoing represents a highly advantageous approach to mass spectrometry, especially for technique varieties dependent upon introducing an inert gas into the instrument. The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. An apparatus for confining secondary ions having a charge, comprising:

a. a back electrode at a back potential;

b. a front electrode, at a front potential, comprising a grid;

c. a middle electrode, at a middle potential which is higher than each of the back and front potentials if the charge is negative and which is lower than each of the back and front electrodes if the charge is positive, between and electrically insulated from the front and back electrodes, having a surface behind the grid d. means for introducing, constituent ions and neutral particles to the electrodes, and e. the middle electrode being configured to confine on the surface at the middle potential: the secondary ions being generated by bombardment of the surface by neutral particles, while not confining, constituent ions to the surface.

2. The apparatus of claim 1 wherein a common aperture penetrates the middle and back electrodes.

3. The apparatus of claim 2 wherein the grid has an opening, the common aperture extending through the opening.

4. The apparatus of claim 2 wherein the apparatus is an ion-focusing lens and the means for introducing admits ions in a matter stream from a mass analyzer into a detector system in a mass spectrometer, the surface facing the matter stream.

5. The apparatus of claim 1 wherein the apparatus is a deflector plate in a detector chamber of a mass spectrometer, the surface of the middle electrode being located opposite an exit from a mass analyzer.

6. The apparatus of claim 1 wherein the middle potential differs from each of the front and back potentials by at least 20 volts.

7. The apparatus of claim 1 wherein the front and back electrodes are at ground potential.

8. The apparatus of claim 4 wherein the mass analyzer is a quadrupole analyzer.

9. The apparatus of claim 1 further comprising a. a back insulating layer between the back and middle electrodes; and b. a front insulating layer between the front and middle electrodes.

10. An ion-focusing lens for admitting constituent ions in a matter stream from a mass analyzer into a detector system in a mass spectrometer and for confining secondary ions generated by neutral particles in the matter stream colliding with the lens, the lens comprising:

a. a back electrode at a back potential;

b. a front electrode, at a front potential, comprising a grid;

c. a middle electrode, between and electrically insulated from the back and front electrodes, at a middle potential which is higher than each of the back and front potentials if the charge is negative and lower than each of the back and front potentials if the charge is positive;

having a surface behind the grid, the middle electrode being configured to confine at the middle potential the secondary ions being generated by bombardment of the surface by neutral particles while not confining constituent ions; and d. a common aperture through the middle and back electrodes through which the constituent ions pass.

11. The apparatus of claim 10 wherein the middle electrode differs from each of the front and back potentials by at least 20 volts.

12. The lens of claim 10 wherein the front and back electrodes are grounded.

13. The lens of claim 11 wherein the front and back electrodes are grounded.

14. The apparatus of claim 10 wherein the mass analyzer is a quadrupole analyzer.

15. The apparatus of claim 10 wherein the common aperture penetrates the grid.

16. The apparatus of claim 10 further comprising a. a back insulating layer between the back electrode and the middle electrode; and b. a front insulating layer between the front electrode and the middle electrode, the common aperture extending through the back and front insulating layers.

17. A method of analyzing a sample by mass spectrometry, the method comprising the steps of:

a. providing an ion source;

b. providing a mass analyzer;

c. providing a detector in a detector chamber;

d. providing a lens between the mass analyzer and the detector chamber, the lens comprising i. a back electrode at a back potential, ii. a front electrode, at a front potential, comprising a grid, iii. a middle electrode, at a middle potential which is higher than each of the back and front potentials if the charge is negative and which is lower than each of the back and front potentials if the charge is positive, between and electrically insulated from the front and back electrodes, having a surface behind the grid, and iv. a common aperture through the back and middle electrodes;

e. converting the sample into constituent ions using the ion source;

f. moving a matter stream comprising constituent ions and excited neutral particles through the mass analyzer toward the lens, the mass analyzer sorting the constituent ions according to their respective mass/charge ratios;

g. passing constituent ions through the aperture into the detector chamber;

h. passing excited neutral particles through the grid so that the particles strike the surface on the middle electrode, resulting secondary ions being confined on the surface at the middle potential; and i. converting the constituent ions to a signal in the detector.

18. The method of claim 17 further comprising the steps of:

a. providing an ion deflector in the detector chamber opposite the aperture, the ion deflector comprising i. a deflector front electrode, at a deflector front potential, comprising a grid, ii. a deflector middle electrode, at a deflector middle potential which is higher than the deflector front potential if the charge is negative and lower than the deflector front potential if the charge is positive, behind and electrically insulated from the deflector front electrode, having a deflector surface behind the grid on which the secondary ions are confined at the deflector middle potential, the secondary ions being generated by bombardment of the surface by neutral particles; and b. delivering excited neutral particles to the deflector surface on the deflector middle electrode, resulting secondary ions being confined on the deflector surface at the deflector middle potential.

19. The method of claim 18 wherein the ion deflector further comprises a deflector back electrode, behind and electrically insulated from the middle electrode, the deflector middle potential being higher than the deflector front potential if the charge is negative and lower than the deflector front potential if the charge is positive.

20. The method of claim 17 further comprising the step of preparing the sample by gas chromatography before converting the sample to constituent ions.

21. The method of claim mass spectrometer of claim 17 wherein the excited neutral particles are helium atoms.

22. The method of claim 17 wherein the middle potential differs from each of the front and back potentials by at least 20 volts.

23. The method of claim 17 wherein the mass analyzer is a quadrupole analyzer.

* * * * *

UNITED STATES PATENT AND TRADEMARK OFFICE

CERTIFICATE OF CORRECTION

PATENT NO. : 7,880,147 B2
APPLICATION NO. : 12/019308
DATED : February 1, 2011
INVENTOR(S) : Peter J. Morrisroe et al.

It is certified that error appears in the above-identified patent and that said Letters Patent is hereby corrected as shown below:

On the title page item (75), correct the spelling of inventor's name "DeCesare" to --DiCesare--.

Signed and Sealed this
Twenty-sixth Day of April, 2011

David J. Kappos
*Director of the United States Patent and Trademark Office*